June 5, 1928.
C. F. FISK
1,672,858
TIRE TUBE AND FLAP AND MANUFACTURE THEREOF
Filed July 1, 1925    2 Sheets-Sheet 1
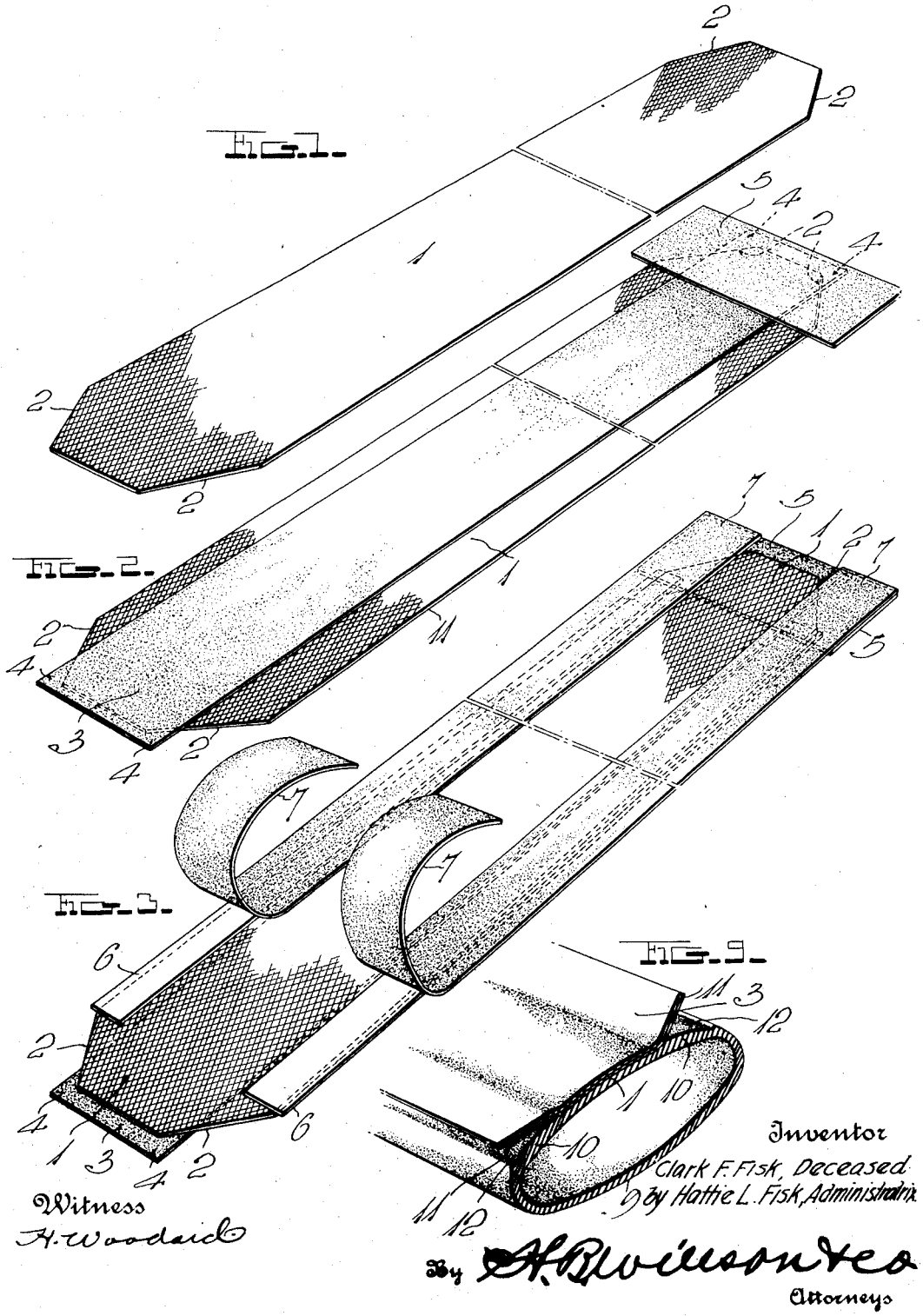

June 5, 1928. 1,672,858
C. F. FISK
TIRE TUBE AND FLAP AND MANUFACTURE THEREOF
Filed July 1, 1925 2 Sheets-Sheet 2
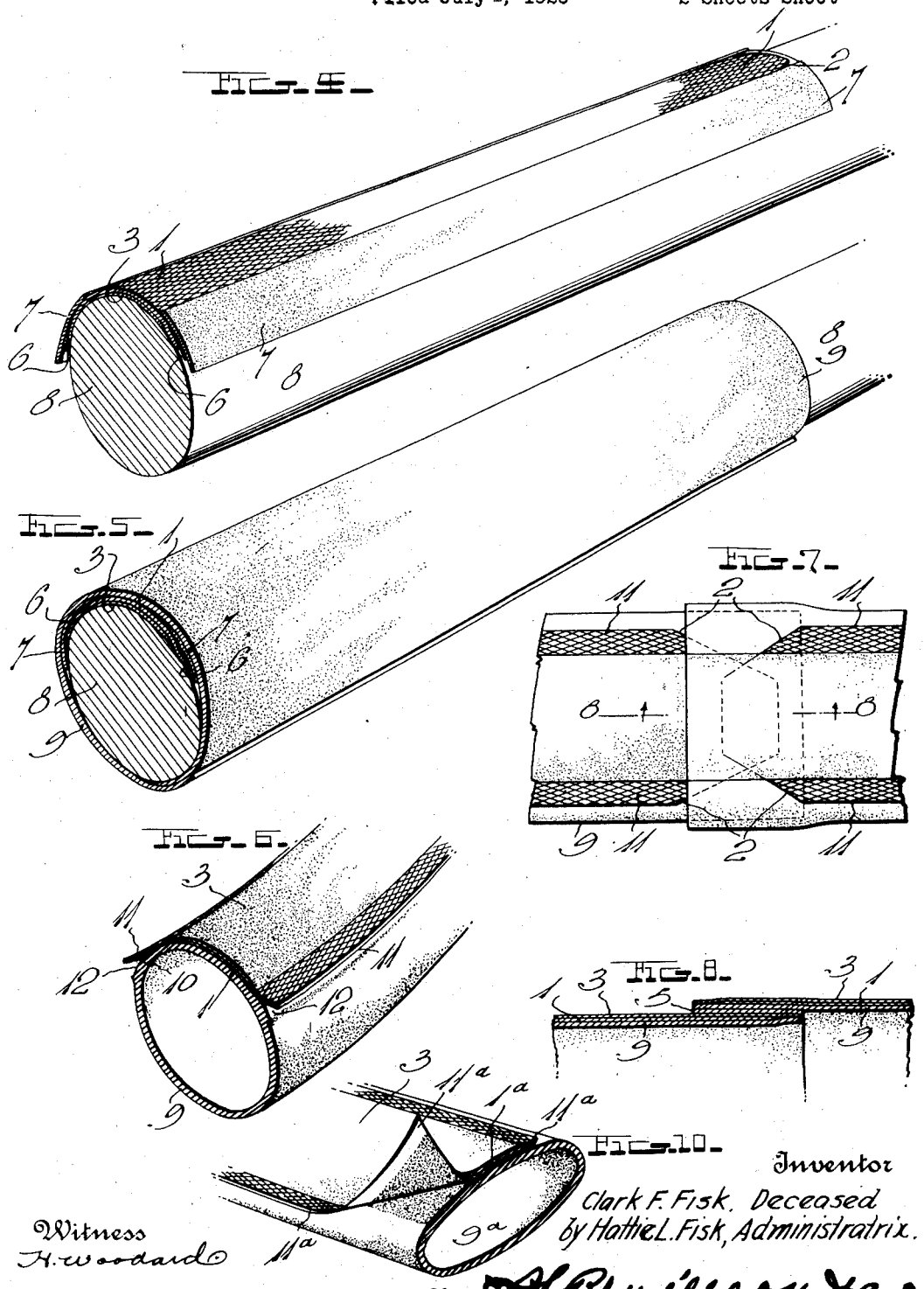
Inventor
Clark F. Fisk, Deceased
by Hattie L. Fisk, Administratrix.

Patented June 5, 1928.

1,672,858

UNITED STATES PATENT OFFICE.

CLARK FRANCIS FISK, OF CAMDEN, NEW JERSEY; HATTIE L. FISK ADMINISTRATRIX OF SAID CLARK FRANCIS FISK, DECEASED.

TIRE TUBE AND FLAP AND MANUFACTURE THEREOF.

Application filed July 1, 1925. Serial No. 40,967.

This invention relates to tire tubes and flaps therefor and has in view improvements of great practical value to the tire manufacturing industry as well as to the millions of owners of pneumatically tired vehicles.

At the present time, due to danger of rim side troubles such as pinching, chafing, rust deterioration, etc., it is customary to protect the rim side of the tube with a fabric flap inserted between the tube and the casing beads. This loose flap is the cause of many complaints. It is difficult to insert and straighten and its insertion requires quite an amount of time; its edges curl, harden and wrinkle and often cause long circumferential ruptures to the tube; it is liable to be displaced when applying the tire, placing the tube in jeopardy; it is subject to creeping in use, particularly in balloon and other low pressure tires; and its general life is not long.

My invention was produced to overcome difficulties such as those above enumerated, by the provision of a flap attached to the rim side of the tube, and only after years of ceaseless study, labor, experimentation, testing, etc., have I been rewarded by the production of an article which meets requirements from the viewpoint of both the manufacturer and the user. The broad idea of flaps or fabric reinforcements for tubes, formed as integral parts of the latter, was old prior to my invention but such tubes had never come into practical use for such reasons as the following: Their cost of manufacture and consequent high cost to the public were prohibitive; there was often great weakening of the rubber tube along the edges of the fabric; and even in the best of the prior devices, there was often no adequate provision for obtaining an absolutely airtight connection between the ends of the tube, effective provision was not made permitting repairing of punctures on the rim side of the tube, the flap fabric at the outer side of the tube was not protected against rim rust, etc. All of these factors and many more were given due consideration in producing the present invention, with the result that a highly practical article has been produced, which has for many months given service beyond reproach to thousands of users.

The flap is formed by a novel method and its structure is unique. Moreover, my method of producing a tube in which the flap is integrally embodied, and the construction of the flap tube, produced by this method or otherwise, are novel. The method steps and structural features I seek to protect by this application, to the extent specified in the appended claims.

Figs. 1 to 5 of the accompanying drawings are perspective views illustrating different steps in the manufacture of the improved flap and the tube embodying said flap as an integral part thereof.

Fig. 6 is a sectional perspective view of a portion of the completed tube.

Fig. 7 is an inner side elevation of the joint between the ends of the tube.

Fig. 8 is a detail longitudinal section on line 8—8 of Fig. 7, both Figs. 7 and 8 showing the joint prior to vulcanizing.

Fig. 9 is a sectional perspective view illustrating a somewhat different form of construction.

Fig. 10 is a sectional perspective showing a still further form of construction.

In carrying out my invention, I take an elongated strip 1 of bias frictional fabric and cut away its corners to abruptly taper the ends of the strip and provide converging edges 2. To one side of the fabric strip 1, I apply a strip 3 of green rubber which may be of less width than the fabric strip, of the same width as indicated in Fig. 9, or even of greater width. The ends of the green rubber strip 3 project longitudinally beyond the ends of the fabric strip 1 and said strip 3 is of at least a width greater than the width of the extremities of said strip 1. Thus, the corner portions 4 of the rubber strip 3 project beyond the converging edges 2 and are exposed at the side of the strip 1, opposite the rubber strip.

Across one end of the rubber strip 3, I apply a green rubber patch 5 which projects laterally beyond the converging edges 2 of the adjacent end of the fabric strip 1. The steps so far mentioned are preferably performed upon a table or like support and after completing such steps, the assembled strips and patch are inverted, as shown in Fig. 3. I then apply non-vulcanizable material 6 to the edge portions of the fabric strip 1 and terminate such non-vulcanizable material about even with the inner ends of the converging edges 2, as shown in Fig. 3. This material 6 may be of strip form, liquid form, or powder form, as long as it will prevent adhering of rubber to the portions of the fabric strip 1, which it covers. I now apply green rubber stripping 7 to the fabric strip 1 and extend its ends longitudinally beyond the edges 2, so that at one end of the flap, the stripping may adhere to the exposed corners 4 of the green rubber strip 3, while at the opposite end of the flap, said stripping 7 may adhere both to the corners 4 and to the patch 5, forming an all-rubber terminal at this end of the flap, which is advantageous for reasons to be hereinafter set forth.

The operations so far described complete the formation of the flap which is to be incorporated with a tube as an integral part thereof, and at the factory, any desired number of these flaps may be made up and "booked" for future use, and obviously they must be of different lengths and widths, according to the sizes of tubes in connection with which they are to be used. It is preferred that the completed flap be attached to the tube in the manner which will now be described, but in some instances, this may be varied.

The assembled green rubber strips, patch and fabric strip are stuck at one end upon a tube mandrel 8 and clamped to the mandrel at said end, if the latter operation is necessary. Usually however, when the green rubber strip 3 which is disposed next to the mandrel, is suitably treated or when an appropriate cement is applied to the mandrel, sufficient tackiness exists to permit the clamping means to be dispensed with. It is essential however, that the end of a flap first applied to the mandrel be held against slippage, as said flap is then stretched by pulling upon its opposite end, and this stretched flap is tightly applied to the mandrel and held thereto by its own viscosity or the tackiness of the cement which may if desired be used. Obviously, the stretching is necessarily restricted to certain limits for different sized tubes, and it may here be stated that the stretching thus imparted to the bias fabric strip 1, is instrumental in causing proper rim side contraction of the completed tube when inflated.

With the flap applied to the mandrel, the rubber stripping 7 is exposed, and if this stripping be two narrow strips, as herein disclosed, the intermediate portion of the fabric strip 1 will also be exposed. However, it is of course possible that the stripping 7 could extend over the entire area of the strip 1, although this is not usually desired.

Around the mandrel 8 and the assembled strips or flap held thereon as shown in Fig. 4, I wrap or roll green rubber 9, so as to form a tube which contacts with the green rubber stripping 6 and in the present instance, contacts also with the intermediate portion of the strip 1 as shown in Fig. 5. This entire assembly of parts is now wrapped with tape in the usual manner and while so held, is vulcanized. This vulcanizing operation forms an integral unit in which the flap becomes a part of the tube. The vulcanizing operation, in joining the green rubber stripping 7 to the tube 9, forms the latter with thickened laterally spaced portions 10 which extend circumferentially of its tread side, and as the non-vulcanizable material 6 formerly located between the edge portions 11 of the strip 1 and the stripping 7, has prevented said stripping and edge portions from uniting with each other, said edge portions 11 are left free to form fins at the edges of the flap, adapted to lie against the outer sides of the thickened portions 10. It will thus be seen that even though the edge portions 11 of the strip 1 may embed slightly in the stripping 7 and thus form shallow depressions 11 in the outer sides of the thickened portions 10 during the vulcanizing process, the thickness of the tube 9 will not be decreased where these depressions exist. There is thus no weakening of the tube at the edges of the flap.

The vulcanizing operation above referred to also integrally unites the rubber strip 11 with the fabric strip 1 and causes said rubber strip to merge at its edges to infinitesimal thickness.

After the vulcanizing operation, the tape wrapping is removed and the vulcanized assembly is stripped from the mandrel 8, leaving the flap at the exterior of the tube, with its portions 11 overlying the thickened tube portions 10 and with its rubber coated inner side 3 exposed at the rim side of the tube.

The formation above described at the ends of the flap, now permits the necessary skiving, buffing, etc., for establishing a vulcanized joint between the ends of the flap tube, and the provision of the patch 5, permits a rubber-to-rubber joint to be produced, when the patch-carrying end of the tube is telescoped into the other end, as shown in Figs. 7 and 8. Thus, when the joint is vulcanized in the conventional or any desired manner, an absolutely air-tight connection is produced, which connection I have not been able to obtain with other structures, with that end in view.

The completed tube possesses numerous advantages—the rim side of this tube is effectively protected against pinching, chafing, rusting, etc.; the tube and the flap are one single unit so that it is not necessary to bother with a separate loose flap, as must now necessarily be done; the rubber coating 3 at the inner side of the flap permits patching or vulcanizing of any rim side punctures, which would not be possible if the fabric strip 1 were here exposed; this rubber strip 3 also protects the fabric strip 1 against the action of rust, and when the coating 3 is extended to or beyond the edges of the fins 11, as shown in Fig. 9, it effectively stiffens them against possible curling, this being very desirable in connection with tubes for balloon tires, in which the fins 11 are unusually wide.

The fins 11, being frictionally clamped between the inflated tube and the tire casing, distribute the stretch in the portions of the tube 9 with which they contact, so that there will be no intensive stretching at the lines where the tube side walls join the fabric band 1, this idea being the same as that disclosed in my prior U. S. Patent No. 1,264,381 of April 30, 1918. Moreover, due to the bias cut of the fabric strip 1, the rim side of the tube is caused to contract and tightly hug the rim under inflation, which idea was also present in the patent just referred to. This idea of cutting the fabric on the bais, as well as the idea of stretching the bias fabric, was also shown in my U. S. Patent No. 1,135,273 of April 13, 1915. Obviously, therefore, no claim is made for the mere provision of the fins 11 nor the mere bias cutting and stretching of the fabric, but nevertheless the association of these features with the other features of novelty, permits the production of an exceptionally efficient and desirable article.

In Fig. 10, I have shown a somewhat different formation. In this form of construction, the tube 9ª is cured separately from the flap. Before the tube is vulcanized, I apply to its rim side, a special compounded strip of rubber which is slow to cure, causing this strip to be only semi-cured after vulcanization. The flap is also semi-cured and treated with special cement, with the result that when this flap is pressed against the tube 9ª, it will adhere to it, and will be attached by self-cure in use. This permits the flap to be pulled loose from the tube, should this be advisable for making a repair. The form of flap shown in Fig. 10 comprises a fabric strip 1ª having free edge portions or fins 11ª, and provided with a rubber cover 3ª at its outer side.

Excellent results have been obtained from the method steps and structural features herein disclosed and they are therefore preferably followed. However, within the scope of the invention as claimed, modifications may be made.

I claim:

1. A tire tube having thickened integral portions extending throughout the circumference of its rim side and spaced apart laterally, and a fabric flap vulcanized to said rim side between said thickened portions, said flap having edge portions overlapping said thickened tube portions and free of connection therewith.

2. A tire tube having thickened integral portions extending throughout the circumference of its rim side and spaced apart laterally, a fabric flap vulcanized to said rim side between said thickened portions, said flap having edge portions overlapping said thickened tube portions and free of connection therewith, and a strip of rubber vulcanized to the exposed side of said fabric flap.

3. A tire tube flap comprising a strip of fabric, and rubber stripping applied to one side of the fabric strip and projecting laterally beyond the longitudinal edges of the latter, said rubber stripping being adapted to be vulcanized or otherwise secured to the tube, said stripping being secured to the fabric strip on longitudinal lines spaced inwardly from said longitudinal edges of the latter but being free of connection with said fabric strip between said longitudinal lines and edges, leaving said fabric strip with free longitudinal edge portions.

4. A tire tube flap comprising a strip of fabric, a rubber strip secured to the outer side of said fabric strip, and rubber stripping applied to the other side of the fabric strip and projecting laterally beyond the longitudinal edges of the latter, said rubber stripping being adapted to be vulcanized or otherwise secured to the tube, said stripping being secured to the fabric strip on longitudinal lines spaced inwardly from said longitudinal edges of the latter but being free of connection with said fabric strip between said longitudinal lines and edges, leaving said fabric strip with free longitudinal edge portions.

5. The method of forming a flap tube comprising the steps of applying non-vulcanizable material to longitudinal edge portions of a fabric strip, applying green rubber stripping longitudinally to the fabric strip and extending said stripping over the non-vulcanizable material and laterally beyond the edges of the fabric strip, shaping green rubber into the form of a tube and placing a longitudinal portion of this tube against said rubber stripping, holding the rubber stripping, fabric strip and green rubber tube in assembled relation, and vulcanizing the assembly while so held.

6. The method of forming a flap tube comprising the steps of applying a green rubber strip longitudinally to one side of a fabric strip, applying non-vulcanizable material to the other side of said fabric strip along its edge portions, applying green rubber stripping to said other side of the fabric strip and extending such stripping over the non-vulcanizable material and laterally beyond the edges of the fabric strip, shaping green rubber into the form of a tube and placing a longitudinal portion of this tube against the green rubber stripping, holding said rubber strip, said rubber stripping, said fabric strip and said tube in assembled relation, and vulcanizing the assembly while so held.

7. The method of forming a flap tube comprising the steps of applying non-vulcanizable material to edge portions of a fabric strip, applying green rubber stripping longitudinally to the fabric strip and extending said stripping over the non-vulcanizable material and laterally beyond the edges of the fabric strip, applying the assembled strips longitudinally to a mandrel with said stripping disposed outwardly, rolling green rubber around the mandrel and across said assembled strips to form a tube, holding the tube and said assembled strips in assembled relation, vulcanizing the entire assembly while so held, stripping the vulcanized assembly from the mandrel, and securing the ends of the tube together.

8. The method of forming a flap tube comprising the steps of applying a green rubber strip longitudinally to one side of a fabric strip, applying non-vulcanizable material to the other side of said fabric strip along its edge portions, applying green rubber stripping to said other side of the fabric strip and extending such stripping over the non-vulcanizable material and laterally beyond the edges of the fabric strip, applying the assembled strips longitudinally to a mandrel with said stripping disposed outwardly, rolling green rubber around the mandrel and across said assembled strips to form a tube, holding the tube and said assembled strips in assembled relation, vulcanizing the entire assembly while so held, stripping the vulcanized assembly from the mandrel, and securing the ends of the tube together.

9. The method of forming a flap tube comprising the steps of applying a green rubber strip longitudinally to one side of a bias fabric strip, applying non-vulcanizable material to the other side of said fabric strip along its edges, applying green rubber stripping to said other side of said fabric strip and extending it across the non-vulcanizable material and laterally beyond the edges of the fabric strip, longitudinally stretching the assembled strips and applying them in stretched condition to a mandrel with said green rubber strip in contact with the mandrel to adhere thereto, rolling green rubber around the mandrel and across the assembled strips to form a tube, holding the tube and the assembled strips in assembled relation, vulcanizing the entire assembly while so held, stripping the vulcanized assembly from the mandrel, and securing the ends of the tube together.

10. The method of forming a flap tube comprising the steps of abruptly tapering the ends of a fabric strip, applying a strip of green rubber longitudinally to one side of said fabric strip and extending it longitudinally beyond said fabric strip and laterally beyond the converging edges of said tapered ends, applying a transverse patch of green rubber across one end of the green rubber strip and extending it laterally beyond said converging edges of said tapered ends of the fabric strip, applying non-vulcanizable material to the other side of said fabric strip along its edge portions, applying green rubber stripping to said other side of the fabric strip and extending it over the non-vulcanizable material and laterally beyond the edges of said fabric strip, extending the end portions of said stripping beyond said converging strip edges and uniting such end portions with the green rubber at the first named side of the fabric strip, forming a double-ended tube of green rubber and applying the assembled strip and patch thereto with the patch disposed away from the tube, vulcanizing the entire assembly, telescoping the patch-carrying end of the tube into the other end of said tube and vulcanizing them together.

11. A flap adapted to be vulcanized to a tube and comprising a strip of fabric having its ends abruptly tapered, a strip of green rubber applied longitudinally to one side of said fabric strip and extending beyond the ends of the latter, said green rubber strip being of greater width than the extremities of the fabric strip whereby the corner portions of said rubber strip are exposed beyond the converging edges of said tapered ends, a green rubber patch extending transversely across one end of said green rubber strip and projecting laterally beyond its edges, and green rubber stripping applied to the side of the fabric strip opposite said first named strip, said green rubber stripping having its ends secured to said exposed corner portions of the first named green rubber strip and to the projecting ends of said green rubber patch, said green rubber stripping being secured to the fabric strip on longitudinal lines spaced inwardly from the longitudinal edges of the latter, but being free of connection with said fabric strip between said longitudinal lines and edges, leaving longitudinal edge portions of said fabric strip free.

12. The method of forming a flap adapted to be vulcanized to a tube, comprising the steps of applying non-vulcanizable material to one side of a fabric strip along its edge portions, securing green rubber stripping to said side and extending said stripping over the non-vulcanizable material and laterally beyond the edges of the fabric strip.

13. The method of forming a flap adapted to be vulcanized to a tube, comprising the steps of securing a green rubber strip longitudinally upon one side of a fabric strip, applying non-vulcanizable material to the other side of said fabric strip along its edge portions, and securing green rubber stripping to said other side and extending said stripping over the non-vulcanizable material and laterally beyond the edges of said fabric strip.

14. The method of forming a flap tube comprising the steps of longitudinally stretching a bias fabric flap on a mandrel and securing the stretched flap to the mandrel, placing green rubber around the mandrel and stretched flap to form a tube, holding the flap and tube in assembled relation and vulcanizing the assembly while so held, stripping the vulcanized assembly from the mandrel, and securing the ends of the tube together.

15. A tire tube having a frictioned fabric flap secured to its rim side and provided with free edge portions, and a continuous strip of solid rubber secured to the outer side of said frictioned fabric flap, said rubber strip being much thicker than the friction coat of rubber on the flap and hence providing a sufficient body of rubber to protect the frictioned fabric against rim rust and to permit air-tight vulcanization of a puncture patch to the rubber.

In testimony whereof I have hereunto affixed my signature.

CLARK FRANCIS FISK.